United States Patent

Pedersen et al.

[15] 3,668,649

[45] June 6, 1972

[54] MULTIPLE TERMINAL COMPUTER CONTROL SYSTEM FOR GROUP POLLING

[72] Inventors: John H. Pedersen, Brussels, Belgium; Michael J. Bedford, Northville, Mich.

[73] Assignee: Burroughs Corporation, Detroit, Mich.

[22] Filed: June 26, 1970

[21] Appl. No.: 50,251

[52] U.S. Cl. ....................................................340/172.5

[51] Int. Cl. ....................................G06f 3/04, H04l 5/00

[58] Field of Search ....................340/172.5, 147, 150, 163; 179/15 AL

[56] References Cited

UNITED STATES PATENTS

| | | | |
|---|---|---|---|
| R26,832 | 3/1970 | Randley | 340/172.5 |
| 3,534,337 | 10/1970 | Martin et al. | 340/172.5 |
| 3,297,994 | 1/1967 | Klein | 340/172.5 |
| 3,308,439 | 3/1967 | Tink et al | 340/172.5 |
| 3,407,387 | 10/1968 | Looschen et al | 340/172.5 X |
| 3,411,143 | 11/1968 | Beausoleil et al | 340/172.5 |
| 3,432,813 | 3/1969 | Annunziata et al | 340/172.5 |
| 3,444,521 | 5/1969 | Breese | 340/163 |
| 3,454,936 | 7/1969 | Bridge et al | 340/172.5 |
| 3,456,242 | 7/1969 | Lubkin et al | 340/172.5 |
| 3,517,130 | 6/1970 | Rynders | 179/15 |

*Primary Examiner*—Paul J. Henon
*Assistant Examiner*—Melvin B. Chapnick
*Attorney*—Kenneth W. Miller and Edwin W. Uren

[57] ABSTRACT

A control system for permitting each one of a plurality of transmit ready terminal computers to reply to a single polling command from a central processor. In an environment wherein a plurality of remote-terminal computers are concatenated to a single modem, a single polling command from the central processor will permit all of the transmit ready terminal computers to transmit data information to the central processing unit. Each terminal computer, being individually controlled through its program, will periodically contend for the communication channel. Logic circuitry is disclosed herein to permit any one of the terminal computers to seize the communication line and to prevent interruption by another terminal computer.

5 Claims, 4 Drawing Figures

INVENTORS
JOHN H. PEDERSEN
MICHAEL J. BEDFORD
BY Russel C. Wells
ATTORNEY

MULTIPLE TERMINAL COMPUTER CONTROL SYSTEM FOR GROUP POLLING

BACKGROUND OF INVENTION

1. Field of Invention

This invention relates to a data communication control system and more particularly to a terminal computer control system for permitting a plurality of concatenated terminal computers to severally and sequentially respond to a single polling command.

2. Prior Art

Prior art data communication systems utilize two communication control messages to initiate the flow of data information between a central processing unit and remote terminal computers. The first message is a select message which permits direct addressing between the central processor unit and the remote terminal computers. One select message can control the operation of only one terminal computer in a data transmission mode.

The second of these communication control messages is a poll message wherein a central processor polls or electronically asks a particular site whether or not any of its terminal computers are transmit ready. If a terminal computer is transmit ready, the central processor will become linked together with that terminal computer until the message routine is complete. After the message is complete, the central processor unit must again initiate a poll message to the same site to see if another terminal computer is transmit ready. The processor repeats itself until all of the transmit ready terminal computers at that particular site have responded and then the central processing unit polls another site. In summary, for each terminal computer that is transmit ready, a separate command signal must be transmitted by the central processor unit.

It is a principle object of this invention to permit all transmit ready terminal computers concatenated to a single modem to respond sequentially to a single poll command from the central processing unit.

It is another object of this invention to randomly permit one of a plurality of remote terminal computers concatenated to a single modem to gain control of the communication channel and prevent interruption by any of the other transmit ready terminal computers connected to that modem.

It is another object of this invention to permit only one transmit ready terminal computer at a particular site to answer a poll command and to prevent the terminal computer that has responded from being able to respond again until all other transmit ready terminal computers have responded.

SUMMARY OF INVENTION

A multiple terminal computer control system controls the responses of a plurality of terminal computers at a given site in a data communication processing system in a predetermined order without specifically addressing each terminal computer at that site. The plurality of terminal computers are concatenated to a single modem unit and each is capable of transmitting data to a central processor unit. The central processor which is linked to the site by a communication channel generates a data communication polling command to one of the terminal addresses known to reside at this site. In response to the poll all of the terminal computers which are transmit ready contend for the communication channel. Logical gating means within each terminal computer function to gain control of the communication channel to the exclusion of all of the other terminal computers. At the conclusion of transmission a control flip flop is reset and a flag in the terminal computer's program is set to prevent that terminal computer from transmitting should it become output ready again before all other output ready terminals have been serviced by the present poll. If another terminal computer at that site is output ready, it begins to transmit immediately upon the conclusion of transmission by the first terminal computer without requiring the central processor sending another poll command.

DETAILED DESCRIPTION

Glossary of Terms

To assist in the understanding of the following, a detailed description, the following terms are herein defined:

- ACK (positive acknowledgement) A communication control character transmitted by the receiver in response to a message from a sender indicating that the receiver has properly received the message sent by the sender.
- AD1 The first machine address character used to partially identify the remote terminal computer.
- AD2 The second address character used in conjunction with the first address character to identify the remote terminal computer.
- BCC A character used for parity check of a complete message.
- CPU Central processing unit is typically a computer performing data manipulations to achieve a desired result such as updating customer balances in a bank. A typical CPU is Burroughs B5000 computer.
- ENQ Communication control character used by a sender to inquire of the status of the receiver.
- EOT A communication control character indicating the completion of an exchange of messages and control sequences between a CPU and a terminal or group of terminals at a site.
- ETX A communication control character indicating the end of text.
- GPL A group polling address comprising AD1 and a portion of AD2.
- MODEM An acronym for MOdulator/DEModulator whose functions is (a) modulate digital signals to audio analog signals for transmission over a communication link; (b) demodulate audio analog signals to reconvert to digital signals.
- NAK (negative acknowledgement) A communication control character indicating that the receiver has not properly received the message sent by the sender.
- POL A communication control character indicating a polling operation.
- RDYSNDI A control signal indicating "ready to send input". This signal would generally represent the status of the terminal computer electrically closer to the modem than the present machine. One exception to this is that in the machine attached to the modem, this signal represents the status of that machine.
- RDYSNDO "Ready to send output" indicates the status of the terminal computer. This signal is supplied to the next adjacent terminal computer electrically furthest from the modem.
- REQSF A signal generated within a terminal computer indicating a "request to send".
- REQSNDO "Request to sent output". This signal is supplied to the next terminal computer electrically closer to the modem indicating that the present machine has requested to send.
- RQS-RDS "Request to send-ready to send". A signal indicating that a given terminal computer has requested to send, has control of a communication channel and is ready to send thereon.
- SOH A communication control character indicating the beginning of a message.

STX A communication control character indicating the start of text.

TR No. A communication message signal indicating the transmission number.

XRF A flip flop which when set indicates that the terminal computer is ready to transmit data.

System Description

Figure 1:
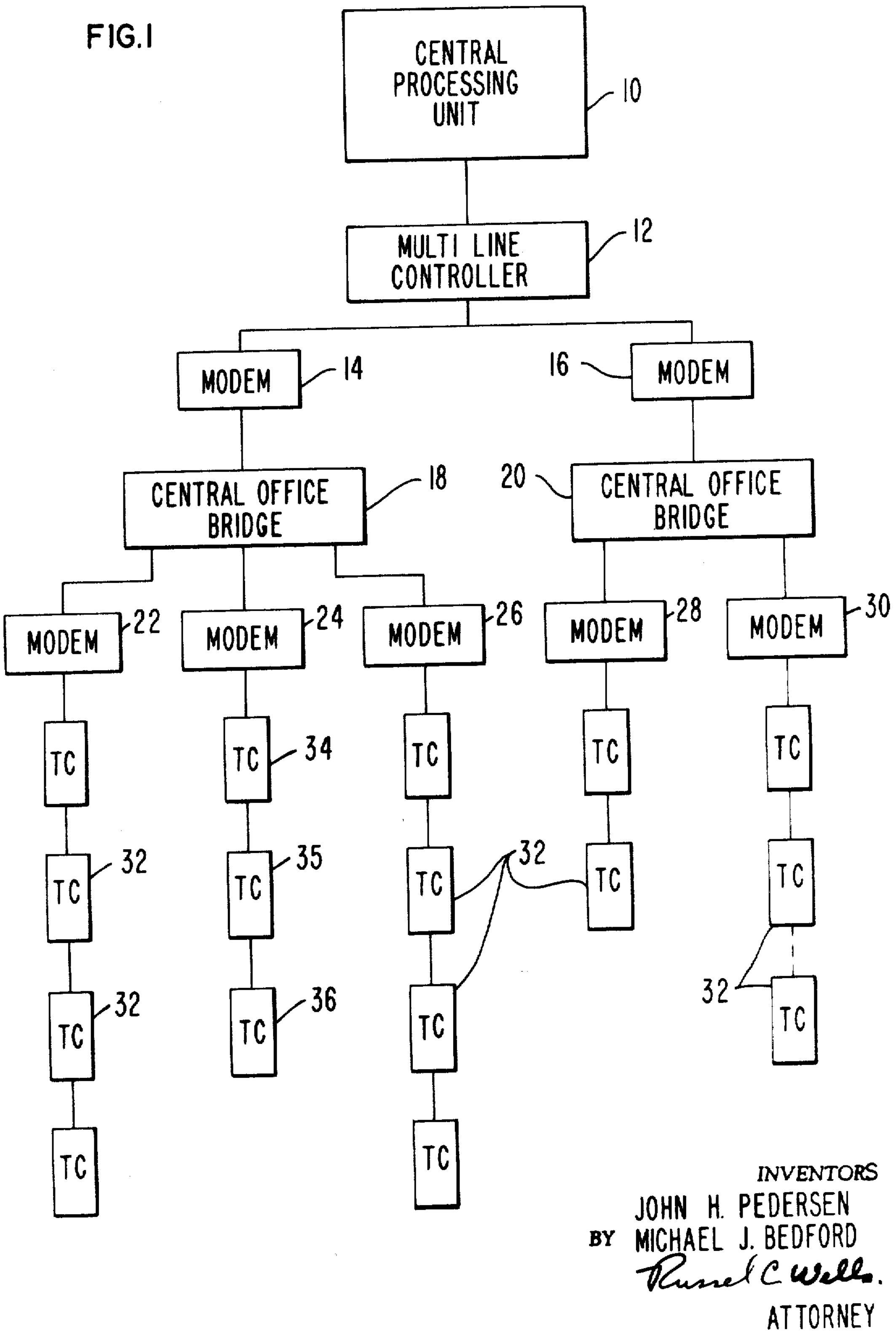
FIG. 1 is a block diagram of a data communication system.

Referring to FIG. 1 by the characters of reference there is illustrated a data communication system embodying the present invention. Such a system as illustrated by FIG. 1 may well be found in the banking industry wherein a central processing unit or CPU 10 is located at the central or main bank. Operatively connected via multi line controller 12 which basically functions to supply one of several outputs from a single input, are a plurality of on-site modems 14 and 16. Each of the modems 14 and 16 are generally physically located on the site of CPU 10 and are connected via a communication channel such as a telephone line to a central office bridge 18 and 20 of a telephone communication system. The telephone communication system including the central office bridges 18 and 20 which are line impedance matching devices at the point of termination and interconnection of customer's lines, encompasses the well-known telephone network there being no changes therein to practice this disclosure. The central office bridge 18 and 20 functions to operatively connect the modems 14 or 16 to one of a plurality of modems 22–30 located at the remote sites. These modems 22, 24, 26, 28 and 30 located at the remote sites are connected to their respective central office 18 or 20 by a four-wire communication channel. Operatively and electrically connected to each remote site modem 22–30 are a plurality of terminal computers or TC's 32, 34, 35, and 36 such as shown in U.S. Pat. No. 3,564,509 entitled Data Processing Apparatus and assigned to the same assignee. The terminal computers 34–36 are electrically connected in concatenation. All of the modems are identical in operation and are well known in the data communication art and different reference characters are used for ease of identifying particular modems.

In the banking industry, each terminal computer 32 may represent a teller's window at a branch bank. The four terminal computers connected to the modem 22 may each represent four individual teller windows. In a similar manner, each of the other modems 22–30 may each represent an additional branch bank and the terminal computers representing the several teller locations within that branch. In order for the CPU to receive or permit data information to be sent to the CPU from one particular teller window, the CPU must select by appropriate addressing that particular teller window. When that particular terminal computer at that teller window is selected, it is then linked to the CPU through the communications network. Additionally if the CPU desires to receive all of the information from a particular branch such as a branch represented by modem 22, the CPU may poll the remote site represented by the modem 22 and thereby allow any terminal computer connected thereto to become linked with the CPU.

As previously indicated, the system disclosed herein in effect combines the best features of both of the above systems. In the present system, in one embodiment thereof, the CPU polls a particular modem and if any terminal computer connected thereto is ready to transmit, that terminal computer is connected to the CPU. However, once that terminal computer has communicated with the CPU, it will not be allowed to communicate again until all of its adjacent terminal computers which are transmit ready have been linked to the CPU. Once each of the terminal computers connected to modem 22 have transmitted to the CPU, the CPU then polls the next modem which in the present example may be modem 24.

In another embodiment of the present invention, the CPU will poll each site and allow only one terminal computer to be linked up to the CPU. Once that computer has been linked to the CPU and the message exchange has been completed, the CPU will then poll the next site.

Operation

Figure 3:
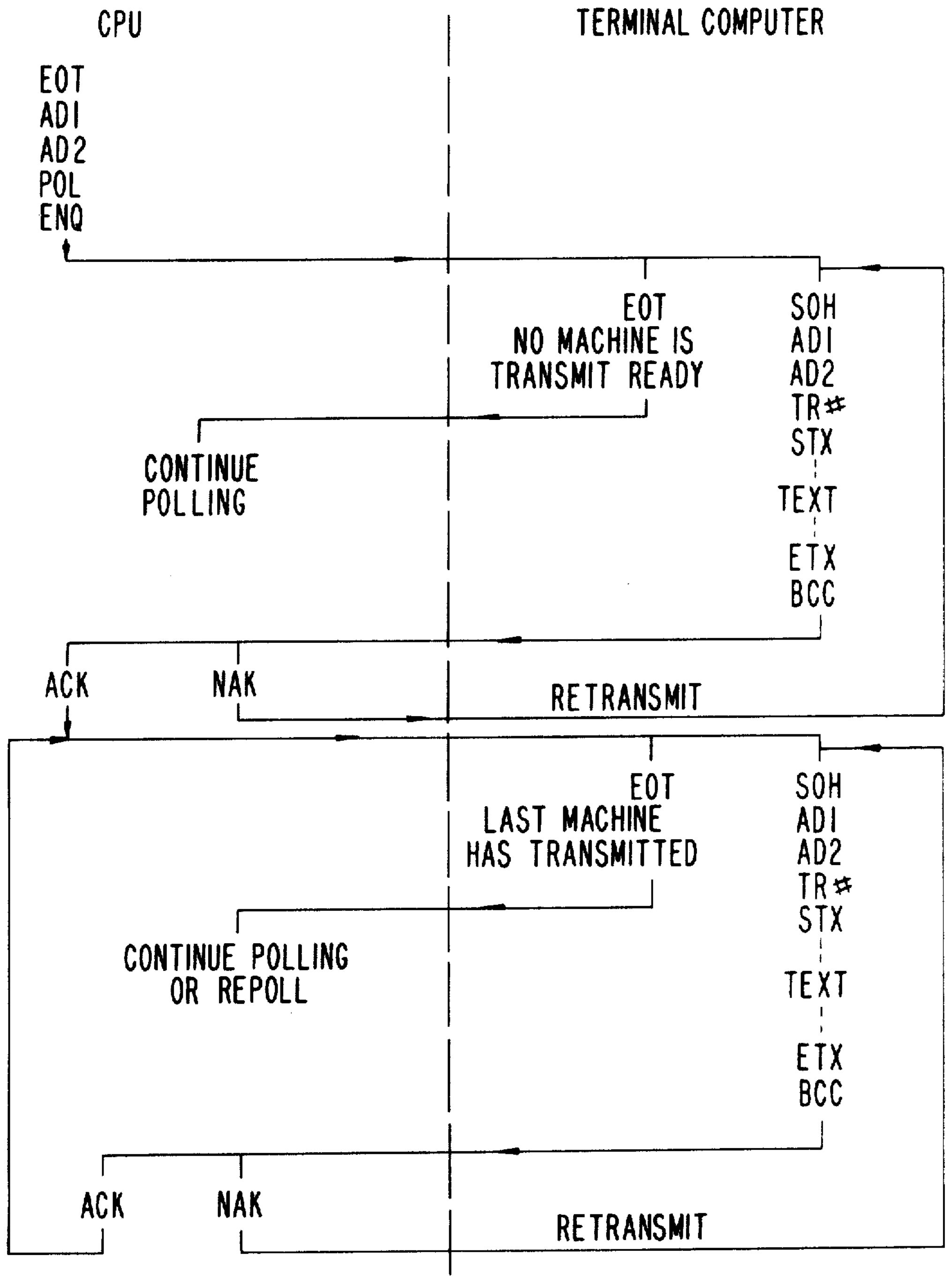
FIG. 3 is a line control diagram illustrating the commands between the CPU and one of the terminal computers according to one embodiment of the invention.

Referring to FIG. 3, there is shown a line specification for one embodiment of the multi terminal computer control system. In this embodiment, the CPU 10 polls a particular site, such as that represented by the modem 24 and inquires whether or not any of the terminal computers 34–36 are ready for transmission. If one or more of the terminal computers are ready for transmission, they will communicate with the CPU through the modem 24 and the central office bridge 18. However, if none of the terminal computers is ready for transmission then EOT will be transmitted from the modem 24 to the CPU and the CPU will then continue polling other locations.

The command generated by the CPU and transmitted over the communication channel to inquire whether or not terminals at a site are ready for transmission is as follows:

| | | | | |
|---|---|---|---|---|
| E | A | A | P | E |
| O | D | D | O | N |
| T | 1 | 2 | L | Q |

Referring to the glossary of terms at the beginning of the specification, it is noted that this command is the polling inquiry command addressed to the particular site identified by AD1 and AD2. In the preferred embodiment, the basic code is the ASCII code which is comprised of seven data bits plus one parity bit. In this embodiment, all of the information bits of AD1 and the upper five information bits of AD2 comprise the GPL of group polling code which is an address of one of the sites represented by modems 22–30. The lower three bits of AD2 on the initial polling command are generally all zeros. However, for the purpose of this embodiment, the lower three bits are basically "don't care" bits in that they are basically ignored on a polling message. When the site receives the polling message, it will answer with either one of the following two messages:

E
O
T or

| | | | | | | | |
|---|---|---|---|---|---|---|---|
| S | A | A | T | S | | E | B |
| O | D | D | R | T | TEXT | T | C |
| H | 1 | 2 | No. | X | | X | C |

The first message which is an EOT is end of transmission indicating to the CPU that none of the terminal computers 34–36 which are operatively connected to the modem 24 are ready for transmission. In such a situation, the terminal computer 34 electrically nearest the modem will transmit the EOT signal. In response to this signal, the CPU will then continue polling other locations.

If one or more of the TC's which are connected to the modem 24 are transmit ready, they will contend for the line to transmit to the CPU. In a manner hereinafter described only one of the TC's will be connected to the communication channel at any one given time. The TC which is linked to the CPU through the communication channels will generate the second message as defined hereinabove. In this second message, the lower three bits of the AD2 signal will contain an address which is unique to the terminal computer which is transmitting. When the text is completed, the ETX and BCC are generated and transmitted to the CPU. Upon receipt by the CPU of this message, the CPU will respond with either of two messages ACK or NAK. If there is a parity failure in the message received, the CPU will respond with a NAK causing the terminal computer to retransmit. Conversely if the parity is correct, the CPU will respond with an ACK signal which when received by the modem 24 will allow the remaining terminal units to contend for the line. After the last terminal computer which is transmit ready has transmitted its message to the CPU and an ACK is received from the CPU, that terminal computer will transmit an EOT signal. When this signal is received by the CPU, the CPU will then change its GPL code and continue polling other locations.

Figure 2:
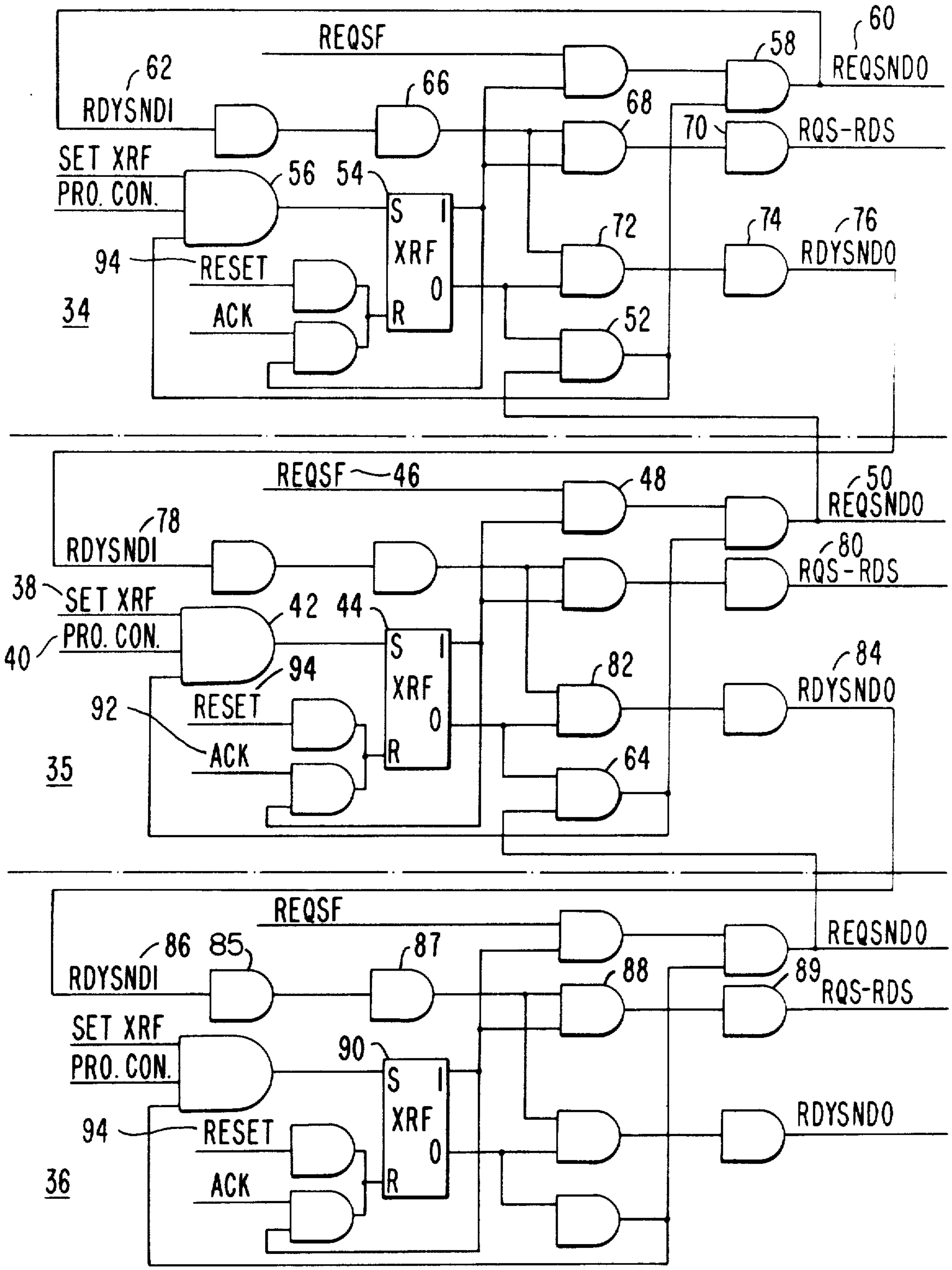
FIG. 2 is a schematic showing the interconnection of three of the terminal computers of FIG. 1.

Referring to FIG. 2 there is shown in schematic form the control system for three concatenated terminal computers 34–36 connected to the modem 24. The circuit at the top of FIG. 2 represents the terminal computer 34 electrically nearest to the modem 24. For the purposes of illustration, we will consider that the middle terminal computer 35 is ready for transmission when the site represented by the modem 24 is polled by the CPU. When the terminal computer 35 becomes ready for transmission, the signal SETXRF 38 is turned on becoming high. Within the program of the terminal computer the computer will constantly test to see whether or not a poll message has been received. When the program has determined that a poll message has been received and the terminal computer is ready for transmission, the program control signal or PRO CON 40 will go high. The third signal on the NAND gate 42 is high and therefore with all three inputs high the output of the gate goes low. This transition will cause the flip flop XRF 44 to set and bring its one output high. At the time the terminal computer 35 is ready to transmit, the request to send signal REQSF 46 goes high and with the one output of XRF 44 high, the output of the NAND gate 48 is low and the request to sent out, REQSNDO 50 signal is high. This signal is connected at the input to a NAND gate 52 in the terminal computer 34 which is electrically nearer the modem 24.

By definition this terminal computer 34 is not ready for transmission, therefore its XRF flip flop 54 is high at its zero output and the output of the NAND gate 52 is low. This output is supplied to the set NAND gate 56 of the XRF flip flop 54 preventing the flip flop from becoming set. The output signal from the NAND gate 52 is also supplied to the NAND gate 58 whose output is REQSNDO 60. Since the input to the NAND gate 58 is low, the output is high. REQSNDO 60 is connected to the RDYSNDI 62, ready to send input signal. Since this is the terminal computer 34 which is electrically nearer to the modem 24, the request to send output signal is wrapped around and supplied to the ready to send input signal of this terminal computer. Note that this is an exception and in all other terminal computers 35 and 36 connected to this modem 24, the request to send output signal of one terminal computer 35 and 36 is connected to a NAND gate 52 and 64 respectively of the next closer terminal computer 34 and 35. However, in this terminal computer 34, the REQSNDO signal now becomes RDYSNDI, which signal is gated through a logic element 66 and is presented as a high input to a NAND gate 68 which on the other input is the one output of the XRF flip flop 54. This output is low and therefore the output of the NAND gate 68 is high which is inverted by the NAND gate 70 and the RQS-RDS, which is request to send-ready to send signal, is low.

The RDYSNDI 62 signal after the NAND gate 66 is also supplied to the second NAND gate 72 which is controlled by the zero output of the XRF flip flop 54. The output of this NAND gate 72 is low since both inputs are high, the signal is inverted in a NAND gate 74 and the RDYSNDO 76, ready to send output signal, is high. This signal is connected to the RDYSNDI 78 of the second terminal computer 35 which in the manner as previously described will cause the RQS-RDS 80 signal of the second terminal computer 35 to become high.

In order to prevent the third terminal computer 36 from gaining control of the communication line, the RDYSNDI 78 signal of the second terminal computer 35 is supplied to one input of NAND gate 82 which has on its other input the zero output the XRF flip flop 44 of the second terminal computer 35. Since this terminal computer is ready for transmitting, the zero output signal of the flip flop 44 is low. The output of this NAND gate 82 is high which is inverted and the RDYSNDO 84 signal of the second terminal computer is low. This signal is supplied to the RDYSNDI 86 signal of the third terminal computer 36 which by definition is not ready for transmitting. The RDYSNDI 86 signal is gated through four NAND gates 85 and 87-89 and the resulting RQS-RDS signal is low; note that this signal is not conditional upon the state of XRF flip flop 90 of third terminal computer 36.

After the second terminal computer 35 has completed its data information transmission to the CPU 10, the CPU will typically respond with an ACK 92 signal if the received information is correct which will reset the XRF flip flop 44 of the second terminal computer 35. Once this flip flop is reset either one of the other two terminal computers 34 or 36 may gain control of the communication line if the computers are transmit ready. The decision as to which one of the other two terminal computers will gain control of the communication line depends upon the operational program step of the terminal computer in its own program control. The selection of which terminal computer will gain control of the line is a random selection dependent upon the program status of the particular terminal computers.

Once an ACK signal is received by a modem in response to a transmission from that site as previously mentioned, this ACK signal will reset the transmit flip flop of the terminal computer which has transmitted and will also initiate a time delay after which will be generated an EOT signal. This time delay is sufficiently long to allow any of the other transmit ready terminal computers to gain control of the transmission line. However, if none of the other terminal computers are transmit ready or have transmitted once during this poll, the time delay will time out and an EOT signal will be generated from the terminal which transmitted. As previously mentioned when the signal is received by the CPU, the CPU will then change its polling address and poll the next site.

Figure 4:
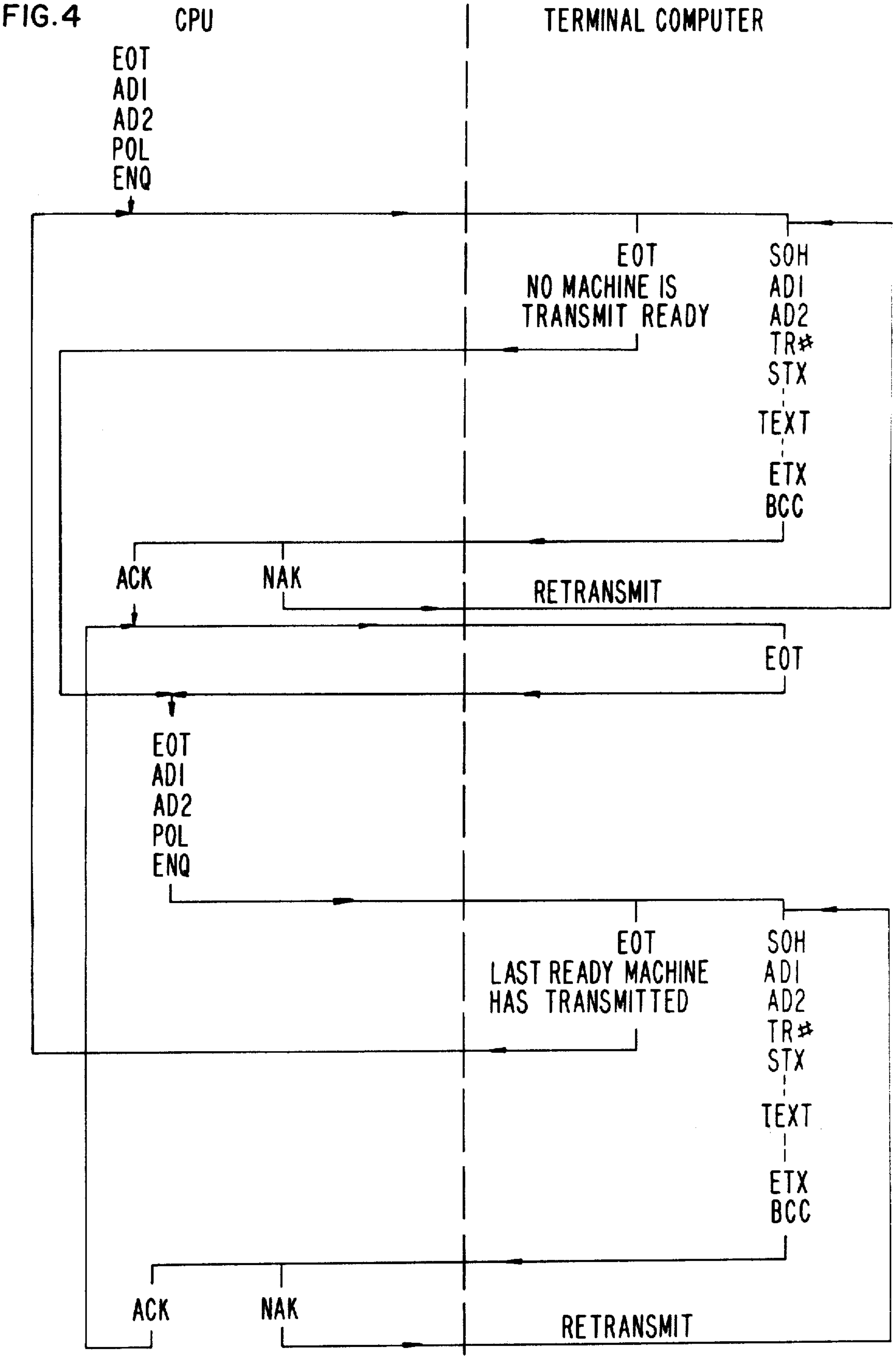
FIG. 4 is a line control diagram illustrating the commands between the CPU and one of the terminal computers according to another embodiment of the invention.

Referring to FIG. 4 there is shown another embodiment of the multi terminal computer control system. This embodiment, which may be typically used when the data information flow from the several branch banks to the main bank is heavy, allows only one terminal computer at a given site to transmit. Once the terminal computer has transmitted, the CPU will then poll the next site regardless of whether or not any of the other terminal computers at that site are transmit ready. In this embodiment, the command generated by the CPU is similar to the embodiment of FIG. 3, with the exception that the low order three bits of the AD2 character are all zeros which is defined as a reset signal 94. The reset signal 94, would be gated to reset the XRF flip flops in a manner as shown in FIG. 2. In this particular embodiment since we have only three available bits in the AD2 address each site will then have up to a maximum of eight terminal computers connected thereto. When the site receives this polling command with the low order three bits of the AD2 address all zeros, all of the terminal computers at this site which are transmit ready will contend for the communication line.

When this polling signal is received by a site, either one of two transmission signals as in the preferred embodiment will be sent. If no terminal computer connected to the modem is transmit ready one of the terminal computers would generate an EOT signal. When the EOT signal is received by the CPU, the CPU will change its GPL address and continue polling other sites. If one or more to the terminal computers are transmit ready upon receipt of the polling inquiry each terminal computer will contend for the line in the same manner as heretofor mentioned resulting in one of the terminal computers gaining control of a communication channel. The terminal computer that gains control of the communication channel will send the following message:

| | | | | | | | |
|---|---|---|---|---|---|---|---|
| S | A | A | T | S | | E | B |
| O | D | D | R | T | TEXT | T | C |
| H | 1 | 2 | No. | X | | X | C |

In this message the low order three bits of the AD2 address will contain the unique address of the terminal computer which transmitted it. When the CPU receives the message and is found correct, it will generate an ACK signal back to the terminal computer. Upon receipt of the ACK, the terminal computer will reset its XRF flip flop and immediately generate an EOT signal. In this embodiment this EOT signal takes precedence over any of the other terminal computers connected to that modem.

Upon receipt of the EOT signal, the CPU will then generate a new polling inquiry signal with a different GPL address and with the low order three bits of AD2 again equal to zero. Also, when the terminal computer generates an EOT signal, it sets an indicator or flag within its own program which indicates that this terminal computer has transmitted to the CPU in response to a polling inquiry.

After the CPU has polled each one of the receiver sites, it will then restart polling each of the sites a second time. In this new polling signal, the lower order three bits of AD2 will not contain all zeros. The CPU may use these low order three bits as a counter and therefore on this restart poll, the lower order three bits may be 001. When this polling signal is received by the site, the terminal computer which transmitted on the previous inquiry will not be able to transmit because of the flag that is set within its program. Any of the other terminal computers at this site which are transmit ready, will then contend for the line. In a similar manner as previously described, one of the terminal computers will transmit and upon receipt of ACK signal from the CPU will generate an EOT to the CPU. This EOT signal will set a flag in this terminal computer indicating that it has transmitted and when received by the CPU, the CPU will then address the site.

This procedure will continue until each and every site has responded and all of the terminal computers which were transmit ready have transmitted their data information. Depending upon the program within the CPU, the CPU may change its inquiry polling message to a particular site whenever the CPU receives EOT response to an inquiry message. When this happens, the low order three bits of the AD2 address will be changed to all zeros or the reset signal 94.

When the site receives a polling inquiry message with all three low order bits of AD2 equal to 000 this is a reset signal which will reset the flags at all of the terminal computers at this location. This will permit all transmit ready terminal computers at this location to again contend for the communication channel in the manner previously described.

What is claimed is:

1. In a data communication system, a multiple terminal computer control system for group polling comprising:
   - a central processing unit operable to transmit a plurality of communication control signals including a poll command having a general machine address,
   - a communication channel operatively connected at one end to said central processing unit,
   - a modem electrically connected to said communication channel at the other end to receive the communication control signals from said central processing unit, said modem operative to transmit data information through said communication channel,
   - a plurality of terminal computers electrically connected in concatenation with said modem and selectively operative to generate data information for data transmission through said communication channel, and
   - logical gating means within each of said terminal computers responsive to said poll command having a general machine address to operatively and exclusively couple any one of said terminal computers having a particular address to said modem for data transmission.

2. In a data communication system, a multiple terminal computer control system for group polling according to claim 1 wherein said logical gating means sequentially couple each of said concatenated terminal computers ready for data transmission to said communication channel in response to said poll command.

3. In a data communication system, a multiple terminal computer control system for group polling according to claim 1 wherein said logical gating means operatively couple only one terminal computer to the communication channel in response to said poll command.

4. In a data communication system, a multiple terminal computer control system for group polling according to claim 3 wherein said logical gating means couple another of said terminal computers to said communication channel in response to a successive poll command from said central processing unit.

5. In a data communication system, a multiple terminal computer control system for group polling, said system comprising:
   - a central processing unit operable to transmit a plurality of communication control signals including a poll command having a general machine address;
   - a communication channel operatively connected at one end to said central processing unit;
   - a plurality of modems electrically connected to said communication channel at the other end to receive the communication control signals from said central processing unit, said modems operative to transmit data information through said communication channel;
   - a plurality of terminal computers electrically connected in concatenation with each of said modems, said terminal computers selectively operative to generate data information for data transmission through said communication channel; and
   - logical gating means within each of said terminal computers responsive to said poll command having a general machine address to operatively and exclusively couple any one of said terminal computers having a particular address to its modem and additionally including means to set a flag within said coupled terminal computer for denying said terminal computer the opportunity for coupling to its modem until the next poll command having a general machine address.

* * * * *